United States Patent [19]
Iwase et al.

[11] Patent Number: 5,847,028
[45] Date of Patent: Dec. 8, 1998

[54] PIGMENT DISPERSION AND OFFSET PRINTING INK COMPOSITION USING THE SAME

[75] Inventors: Koji Iwase; Hideki Kinoshita; Teruhisa Sato; Hiroyuki Ishikawa, all of Osaka, Japan

[73] Assignee: Sakata INX Corp., Osaka, Japan

[21] Appl. No.: 770,152

[22] Filed: Dec. 19, 1996

[30] Foreign Application Priority Data

| Dec. 25, 1995 | [JP] | Japan | 7-337383 |
| Mar. 12, 1996 | [JP] | Japan | 8-054944 |
| Sep. 13, 1996 | [JP] | Japan | 8-243843 |

[51] Int. Cl.⁶ ............................................. C08L 63/10
[52] U.S. Cl. ............................................. 523/414; 523/415
[58] Field of Search .................................... 523/414, 415

[56] References Cited

U.S. PATENT DOCUMENTS

| 4,224,212 | 9/1980 | Topham | 260/33.6 |
| 4,780,524 | 10/1988 | Dobbelstein | 523/414 |
| 5,055,168 | 10/1991 | Lawrenz . | |
| 5,086,092 | 2/1992 | Schupp | 523/414 |
| 5,262,465 | 11/1993 | Ott | 523/415 |
| 5,336,702 | 8/1994 | Kamikado | 523/414 |
| 5,521,250 | 5/1996 | Wamprecht | 526/271 |
| 5,536,804 | 7/1996 | Yamada | 523/415 |
| 5,539,026 | 7/1996 | Kann | 523/428 |
| 5,565,508 | 10/1996 | Hoenel | 523/414 |

FOREIGN PATENT DOCUMENTS

| 0 013 909 A1 | 8/1980 | European Pat. Off. . |
| 0 047 361 A1 | 3/1982 | European Pat. Off. . |
| 0 549 968 A1 | 7/1993 | European Pat. Off. . |
| 56-39809 | 9/1981 | Japan . |
| 61-163977 A | 7/1986 | Japan . |
| 61-2341919 A | 10/1986 | Japan . |
| 63-363 A | 1/1988 | Japan . |
| 63-30057 B2 | 6/1988 | Japan . |

*Primary Examiner*—Paul R. Michl
*Attorney, Agent, or Firm*—Kubovcik & Kubovcik

[57] ABSTRACT

A pigment dispersion is disclosed which comprises a pigment, a pigment dispersant, and optionally a binder resin, wherein the pigment dispersion comprises as the pigment dispersion at least 0.2 parts by weight of a modified novolak resin (A) and/or a graft copolymer (B) relative to 100 parts by weight of the pigment, the modified novolak resin (A) and the graft copolymer (B) each having an aromatic ring and a ring structure given by ring opening of an epoxy group by a carboxyl group of a hydroxycarboxylic acid or a derivative thereof. An ink composition for offset printing containing the pigment dispersion is also disclosed.

7 Claims, No Drawings

_US 5,847,028_

PIGMENT DISPERSION AND OFFSET PRINTING INK COMPOSITION USING THE SAME

BACKGROUND OF THE INVENTION

The present invention relates to a pigment dispersion suitable for preparation of coating compositions wherein a pigment is finely and stably dispersed in a high concentration in a non-aqueous solvent for applications in industrial fields of inks, paints, pigmented photoresists and the like, and particularly suitable for preparation of an offset printing ink composition which is excellent both in the pigment dispersibility and in the printability. The present invention further relates to an offset printing ink composition using the pigment dispersion.

Pigments are widely used for coating compositions such as inks, paints, pigmented photoresists and the like for the purposes of coloring, light shielding, rust prevention and the like. Such coating compositions require a clear color shade, a high gloss, a high color strength, a high transparency, a high fluidity allowing for easy handling and coating or printing, and a high stability for prevention of reagglomeration of pigment particles during a long-term storage. Therefore, the coating compositions should maintain a fine dispersion of a pigment (which means a dispersion of fine particles of a pigment, hereinafter the same) even with a high concentration of the pigment. However, it is often difficult to provide a stable fine dispersion of a pigment, because pigment particles once finely dispersed by means of a mill or the like are liable to reagglomerate or flocculate to form a network structure, leading to a reduced clearness, a reduced color strength, a reduced transparency, an increased viscosity, an increased yield value of the dispersion on standing, and a reduced fluidity on heating. This not only reduces the quality of printed matters or coated matters, but also causes troubles in a printing or coating process or in a production process of an ink, a paint, a pigmented photoresist or the like.

To overcome such problems, various approaches have been taken by using pigment dispersants. For example, there is disclosed a pigment dispersant wherein a copper phthalocyanine moiety is introduced at a terminal position of a polyester derived from a long-chain hydroxycarboxylic acid in Japanese Unexamined Patent Publication No. 63-363 (1988); a pigment dispersant prepared by reaction of a polyester derived from a long-chain hydroxycarboxylic acid with polyethylene glycol diamine in Japanese Unexamined Patent Publication No. 61-234919 (1986); a pigment dispersant prepared by reaction of a polyester derived from a long-chain hydroxycarboxylic acid with a piperazine in Japanese Unexamined Patent Publication No. 61-163977 (1986); a pigment dispersant prepared by reaction of a polyester derived from a long-chain hydroxycarboxylic acid with a poly(lower alkylene)imine in Japanese Examined Patent Publication No. 63-30057 (1988); and a pigment dispersant comprised of a metal salt of a long-chain hydroxycarboxylic acid in Japanese Examined Patent Publication No. 56-39809 -(1981).

These pigment dispersants are effective to some degree in dispersing a pigment in a higher concentration in a non-aqueous dispersion medium and in stabilizing the dispersion, but do not offer a satisfactory effect on stabilization of a fine dispersion of the pigment.

In addition, where the conventional pigment dispersant is used for an offset printing ink, the pigment dispersant promotes the emulsification of the ink more than required, and adversely affects the emulsification property of the ink (which means properties relating to emulsification, e.g., water allowance and stability of the emulsified ink, hereinafter the same), failing to provide a satisfactory printed matter. More specifically, in offset printing which is an image forming method utilizing an interfacial repulsion between dampening water and ink, the use of the pigment dispersant adversely affecting the emulsification property results in a scumming or greasing which is caused by undesirable ink transfer onto non-image area of a plate. Thus, problems associated with the printability of the ink may result. In order to restore the emulsification property of the ink to an appropriate level, another additive should be added to the ink or, alternatively, the application range or use amount of the pigment dispersion should be limited. Where the conventional pigment dispersant is used to prepare an ink base by way of flushing process in which water in a press cake is replaced with a vehicle, separation of the water from the vehicle is not sufficient, thereby reducing the production efficiency.

As described above, the pigment dispersants are required to improve the dispersibility as well as to possess properties suitable for production of inks, paints, pigmented photoresists and the like and properties suitable for printing or applying them.

In view of the foregoing, it is an object of the present invention to provide a pigment dispersion which contains a pigment finely and stably dispersed even in a high concentration and, when used for an ink composition for offset printing, does not cause deterioration of the emulsification property and printability of the ink.

It is another object of the present invention to provide an ink composition for offset printing which uses the pigment dispersion.

The foregoing and other objects of the present invention will be apparent from the following detailed description.

SUMMARY OF THE INVENTION

As a result of intensive studies, the present inventors have found that the aforesaid problems can be solved by using the following particular compounds as a pigment dispersant, and attained the present invention.

In accordance with a first feature of the present invention, there is provided a pigment dispersion comprising a pigment, a pigment dispersant, and optionally a binder resin;

the pigment dispersion comprising as the pigment dispersant at least 0.2 part by weight of at least one of a modified novolak resin (A) or a graft copolymer (B) relative to 100 parts by weight of the pigment, the modified novolak resin (A) and the graft copolymer (B) each having an aromatic ring and a structure given by ring opening of an epoxy group by a carboxyl group of a hydroxycarboxylic acid or a derivative thereof;

the modified novolak resin (A) containing at least one group represented by formula (1):

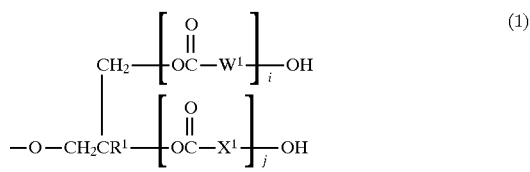

wherein the oxygen atom at the left end is derived from an oxygen atom of a phenolic hydroxyl group of a novolak resin; $W^1$ and $X^1$ are independently each a divalent hydrocarbon group having 1 to 19 carbon atoms; i and j are an integer of 1 to 30 and an integer of 0 to 30, respectively; and $R^1$ is a hydrogen atom or a methyl group;

the graft copolymer (B) having a weight average molecular weight of 3,000 to 100,000 and containing at least 10% by mole of a recurring unit represented by formula (2) and at least 10% by mole of at least one recurring unit selected from the group consisting of recurring units represented by formulae (3) and (4):

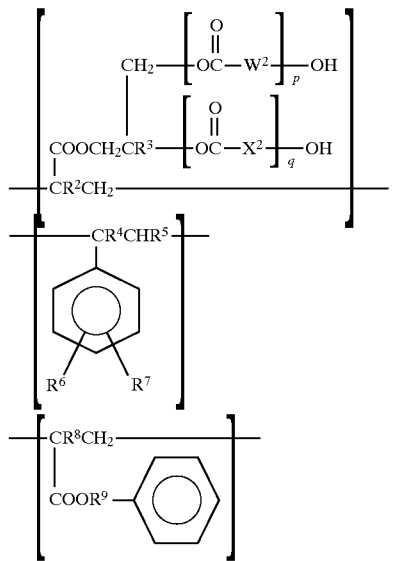

wherein $W^2$ and $X^2$ are independently each a divalent hydrocarbon group having 1 to 19 carbon atoms; p and q are an integer of 1 to 30 and an integer of 0 to 30, respectively; $R^2$, $R^3$ and $R^4$ are independently each a hydrogen atom or a methyl group; $R^5$ is a hydrogen atom or a halogen atom; $R^6$ and $R^7$ are independently each a hydrogen atom, a hydrocarbon group having 1 to 5 carbon atoms, an alkoxy group having 1 to 5 carbon atoms, an aryloxy group having 6 to 10 carbon atoms or a halogen atom; $R^8$ is a hydrogen atom or a methyl group; and $R^9$ is a direct bond (which means that the phenyl group is directly bonded to the oxygen atom adjacent to the carbonyl group, hereinafter the same) or a methylene group.

Herein, the phenolic hydroxyl group of a novolak resin is intended to mean a hydroxyl group directly attached to a carbon atom constituting an aromatic ring (hereinafter the same).

In a first embodiment of the first feature, there is provided a pigment dispersion wherein the modified novolak resin (A) further contains, in a molecule thereof, at least one group represented by formula (5):

wherein the oxygen atom at the left end is derived from an oxygen atom of a phenolic hydroxyl group of the novolak resin; Y is a monovalent organic group having 1 to 20 carbon atoms and, at its bonding end, an oxygen atom or a nitrogen atom (excluding a group represented by formula (6):

wherein $W^1$ and i each have the same definition as recited above); and $R^{10}$ is a hydrogen atom or a methyl group.

In a second embodiment of the first feature, there is provided a pigment dispersion wherein the modified novolak resin (A) is intermolecularly or intramolecularly bridged by a crosslinking group represented by formula (7):

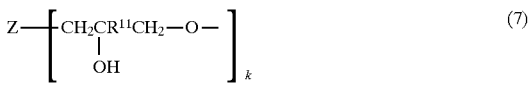

wherein the oxygen atom at the right end is derived from an oxygen atom of a phenolic hydroxyl group of the same or different molecule of the novolak resin; Z is a divalent to hexavalent organic group having 1 to 40 carbon atoms and, at its bonding end, an oxygen atom or a nitrogen atom; k is an integer of 2 to 6; and $R^{11}$ is a hydrogen atom or a methyl group.

In a third embodiment of the first feature, there is provided a pigment dispersion wherein the ratio of phenolic hydroxyl groups remaining in the modified novolak resin (A) is not higher than 5.0%.

Herein, the ratio of phenolic hydroxyl groups remaining in the modified novolak resin (A) is intended to mean the ratio of the number of the remaining non-substituted phenolic hydroxyl groups to the total number of the non-substituted and substituted phenolic hydroxyl groups (hereinafter the same).

In a fourth embodiment of the first feature, there is provided a pigment dispersion wherein the modified novolak resin (A) contains no phenolic hydroxyl group and further contains, in a molecule thereof, at least one group represented by formula (8):

wherein the oxygen atom at the left end is derived from an oxygen atom of a phenolic hydroxyl group of the novolak resin; and $R^{12}$ is a hydrogen atom or a methyl group.

In a fifth embodiment of the first feature, there is provided a pigment dispersion wherein the graft copolymer (B) further contains, in a molecule thereof, at least one recurring unit represented by formula (9):

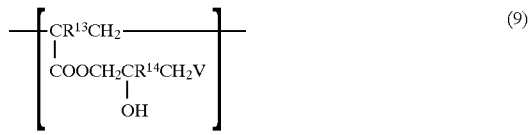

wherein V is a monovalent organic group having 1 to 20 carbon atoms and, at its bonding end, an oxygen atom or a nitrogen atom (excluding a group represented by formula (10):

wherein $W^2$ and p each have the same definition as recited above); and $R^{13}$ and $R^{14}$ are independently each a hydrogen atom or a methyl group.

In a sixth embodiment of the first feature, there is provided a pigment dispersion wherein the graft copolymer (B) further contains, in a molecule thereof, at least one recurring unit represented by formula (11):

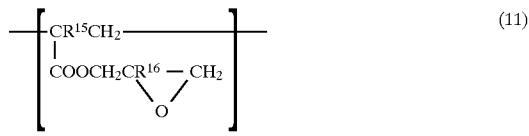

wherein $R^{15}$ and $R^{16}$ are independently each a hydrogen atom or a methyl group.

In a seventh embodiment of the first feature, there is provided a pigment dispersion wherein the group represented by formula (1) is a group represented by formula (12):

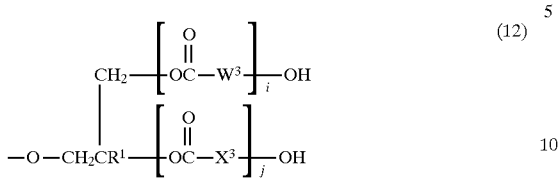
(12)

wherein the oxygen atom at the left end is derived from an oxygen atom of a phenolic hydroxyl group of the novolak resin; $W^3$ and $X^3$ are independently each a divalent hydrocarbon group having 11 to 19 carbon atoms; i and j are an integer of 1 to 30 and an integer of 0 to 30, respectively; and $R^1$ is a hydrogen atom or a methyl group.

In an eighth embodiment of the first feature, there is provided a pigment dispersion wherein the recurring unit represented by formula (2) is a recurring unit represented by formula (13):

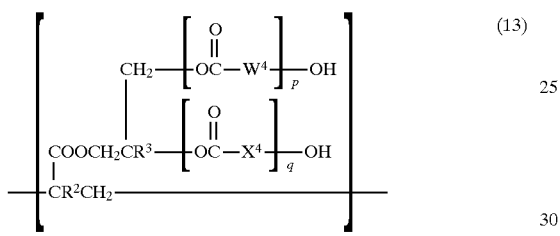
(13)

wherein $W^4$ and $X^4$ are independently each a divalent hydrocarbon group having 11 to 19 carbon atoms; p and q are an integer of 1 to 30 and an integer of 0 to 30, respectively; and $R^2$ and $R^3$ are independently each a hydrogen atom or a methyl group.

In accordance with a second feature of the present invention, there is provided an ink composition for offset printing comprising a pigment dispersion, a binder resin and a solvent;

the pigment dispersion comprising a pigment, a pigment dispersant, and optionally a binder resin;

the pigment dispersion comprising as the pigment dispersant at least 0.2 part by weight of at least one of a modified novolak resin (A) or a graft copolymer (B) relative to 100 parts by weight of the pigment, the modified novolak resin (A) and the graft copolymer (B) each having an aromatic ring and a structure given by ring opening of an epoxy group by a carboxyl group of a hydroxycarboxylic acid or a derivative thereof;

the modified novolak resin (A) containing at least one group represented by formula (12):

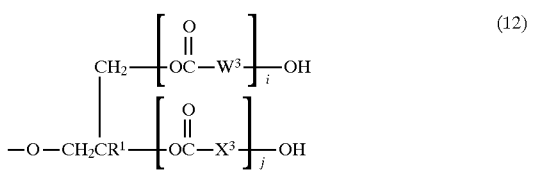
(12)

wherein the oxygen atom at the left end is derived from an oxygen atom of a phenolic hydroxyl group of a novolak resin; $W^3$ and $X^3$ are independently each a divalent hydrocarbon group having 11 to 19 carbon atoms; i and j are an integer of 1 to 30 and an integer of 0 to 30, respectively; and $R^1$ is a hydrogen atom or a methyl group;

the graft copolymer (B) having a weight average molecular weight of 3,000 to 100,000 and containing at least 10% by mole of a recurring unit represented by formula (13) and at least 10% by mole of at least one recurring unit selected from the group consisting of recurring units represented by formulae (3) and (4):

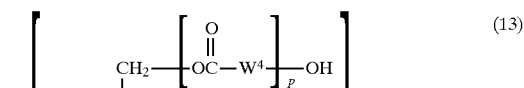
(13)

(3)

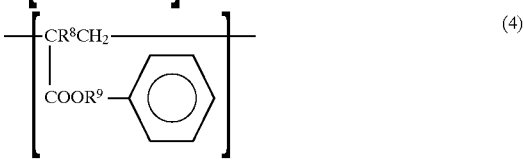
(4)

wherein $W^4$ and $X^4$ are independently each a divalent hydrocarbon group having 11 to 19 carbon atoms; p and q are an integer of 1 to 30 and an integer of 0 to 30, respectively; $R^2$, $R^3$ and $R^4$ are independently each a hydrogen atom or a methyl group; $R^5$ is a hydrogen atom or a halogen atom; $R^6$ and $R^7$ are independently each a hydrogen atom, a hydrocarbon group having 1 to 5 carbon atoms, an alkoxy group having 1 to 5 carbon atoms, an aryloxy group having 6 to 10 carbon atoms or a halogen atom; $R^8$ is a hydrogen atom or a methyl group; and $R^9$ is a direct bond or a methylene group.

In a first embodiment of the second feature, there is provided an ink composition wherein the modified novolak resin (A) further contains, in a molecule thereof, at least one group represented by formula (5):

(5)

wherein the oxygen atom at the left end is derived from an oxygen atom of a phenolic hydroxyl group of the novolak resin; Y is a monovalent organic group having 1 to 20 carbon atoms and, at its bonding end, an oxygen atom or a nitrogen atom (excluding a group represented by formula (15):

(15)

wherein $W^3$ and i each have the same definition as recited above); and $R^{10}$ is a hydrogen atom or a methyl group.

In a second embodiment of the second feature, there is provided an ink composition wherein the modified novolak resin (A) is intermolecularly or intramolecularly bridged by a crosslinking group represented by formula (7):

(7)

wherein the oxygen atom at the right end is derived from an oxygen atom of a phenolic hydroxyl group of the same or different molecule of the novolak resin; Z is a divalent to hexavalent organic group having 1 to 40 carbon atoms and, at its bonding end, an oxygen atom or a nitrogen atom; k is an integer of 2 to 6; and $R^{11}$ is a hydrogen atom or a methyl group.

In a third embodiment of the second feature, there is provided an ink composition wherein the ratio of phenolic hydroxyl groups remaining in the modified novolak resin (A) is not higher than 5.0%.

In a fourth embodiment of the second feature, there is provided an ink composition wherein the modified novolak resin (A) contains no phenolic hydroxyl group and further contains, in a molecule thereof, at least one group represented by formula (8):

wherein the oxygen atom at the left end is derived from an oxygen atom of a phenolic hydroxyl group of the novolak resin; and $R^{12}$ is a hydrogen atom or a methyl group.

In a fifth embodiment of the second feature, there is provided a pigment dispersion wherein the graft copolymer (B) further contains, in a molecule thereof, at least one recurring unit represented by formula (9):

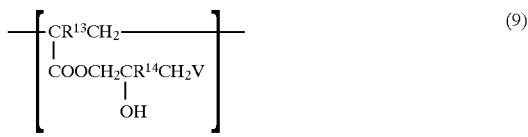

wherein V is a monovalent organic group having 1 to 20 carbon atoms and, at its bonding end, an oxygen atom or a nitrogen atom (excluding a group represented by formula (23):

wherein $W^4$ and p each have the same definition as recited above); and $R^{13}$ and $R^{14}$ are independently each a hydrogen atom or a methyl group.

In a sixth embodiment of the second feature, there is provided an ink composition wherein the graft copolymer (B) further contains, in a molecule thereof, at least one recurring unit represented by formula (11):

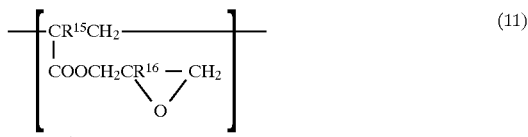

wherein $R^{15}$ and $R^{16}$ are independently each a hydrogen atom or a methyl group.

DETAILED DESCRIPTION

In the present invention, use of, as a pigment dispersant, a modified novolak resin and/or a graft copolymer each having in a molecule thereof an aromatic ring and a structure given by ring opening of an epoxy group by a carboxyl group derived from a hydroxycarboxylic acid or a derivative thereof suppresses the structural viscosity characteristic of a fine dispersion of a pigment in a high concentration, thereby imparting to a coating composition a high fluidity which is required for the handling, coating or printing, or production of an ink, a paint, a pigmented photoresist or the like, and a high stability that dispersed pigment particles do not reagglomerate or flocculate over a long period. Since the pigment dispersant of the present invention also does not promote the emulsification, an offset printing ink composition containing the pigment dispersion offers a drastic improvement in the emulsification property and printability. Thus the ink composition provides for a print image having a clearer color shade, a higher gloss, a higher color strength and a higher transparency.

A detailed explanation will hereinafter be given to the pigment dispersion according to the present invention which contains a pigment, a pigment dispersant comprising a modified novolak resin and/or a graft copolymer and, as required, a binder resin, and to an offset printing ink composition according to the present invention using such a pigment dispersion.

The modified novolak resin in accordance with the present invention will first be described.

A novolak resin used for preparation of the modified novolak resin is derived from an aldehyde and a monohydric phenol or a polyhydric phenol such as dihydroxybenzene or trihydroxybenzene. Examples of specific monohydric phenols include phenol; and alkyl derivatives of phenol such as cresol, xylenol, trimethylphenol, propylphenol, butylphenol, amylphenol, hexylphenol, octylphenol, nonylphenol and dodecylphenol; monohydroxydiphenylmethanes; and phenols having an aromatic substituent such as phenylphenol. Example of specific polyhydric phenols include di- or trihydroxybenzenes such as catechol, resorcinol, hydroquinone and trihydroxybenzene, and alkyl or aryl derivatives of the forgoing di- or trihydroxybenzenes; dihydroxydiphenylmethanes such as bisphenol A and bisphenol F; and dihydroxybiphenyls. Halo derivatives of the aforesaid phenols can also be used which include, for example, chlorinated phenols and brominated phenols. These phenols may be used either alone or as a mixture of two or more species thereof.

It is preferred for high reactivity to use phenol or a phenol with a single alkyl substituent at its meta position among the aforesaid monohydric phenols, or resorcinol among the aforesaid polyhydric phenols.

Usable as the aldehyde are those commonly used for production of novolak resins without particular limitation. Examples thereof include lower aliphatic aldehydes such as formaldehyde, paraformaldehyde, trioxane, cyclic formals, acetaldehyde, propionaldehyde, n-butylaldehyde, isobutylaldehyde and glyoxal; and aromatic aldehydes such as furfural and benzaldehyde. These aldehydes may be used either alone or as a mixture of two or more species thereof.

For synthesis of the novolak resin, a reaction of a phenol with an aldehyde is carried out at 80° to 130° C. in the presence of an acid catalyst such as p-toluenesulfonic acid, perchloric acid, hydrochloric acid, nitric acid, sulfuric acid, chloroacetic acid, oxalic acid or phosphoric acid by an ordinary method. The reaction may be followed by measuring the molecular weight by way of gel permeation chromatography (GPC).

The novolak resin may be synthesized from a phenol derivative having a hydroxymethyl group such as saligenin or from a phenol derivative having a halogenated methyl group such as o-chloromethylphenol.

The resulting novolak resin is reacted with epichlorohydrin and/or β-methylepichlorohydrin to provide a novolak resin having an epoxy group. Alternatively, a commercially available novolak resin having an epoxy group may be used.

The novolak resin having an epoxy group is reacted with a carboxylic acid or an amine (which will be described later) to give a modified novolak resin. This reaction can be conducted at 60° to 160° C., if necessary in a solvent, if necessary in the presence of a catalyst such as an aliphatic amine, an aromatic amine or an ammonium salt. The reaction may be followed by measuring the molecular weight by way of GPC or by measuring the epoxy equivalent.

Alternatively, one or more phenolic hydroxyl groups of a phenol as described above is first reacted with epichlorohydrin and/or β-methylepichlorohydrin to give a glycidyloxy group and/or 2,3-epoxy-2-methylpropyloxy group, which is then reacted with a carboxylic acid or an amine which is to be described later. Another phenol is added to the reaction product as required, which is then reacted with an aldehyde to give a modified novolak resin according to the present invention.

For formation of the group represented by formula (1) or (12) in the modified novolak resin according to the present invention, the phenolic hydroxyl group of the novolak resin or phenol may be reacted with epichlorohydrin and/or β-methylepichlorohydrin, and then with a hydroxycarboxylic acid having 2 to 20 carbon atoms and optionally having an unsaturated bond and/or a branched structure, a mixture of such hydroxycarboxylic acids or a polycondensation product of one or more such hydroxycarboxylic acids; or with a hydroxycarboxylic acid having 12 to 20 carbon atoms and optionally having an unsaturated bond and/or a branched structure, a mixture of such hydroxycarboxylic acids or a polycondensation product of one or more such hydroxycarboxylic acids.

In formula (1), the oxygen atom at the left end is derived from an oxygen atom of a phenolic hydroxyl group of the novolak resin; $W^1$ and $X^1$ each represent a divalent hydrocarbon group having 1 to 19 carbon atoms and optionally having an unsaturated bond and/or a branched structure; and $R^1$ represents a hydrogen atom or a methyl group. In formula (12), the oxygen atom at the left end is derived from an oxygen atom of a phenolic hydroxyl group of the novolak resin; $W^3$ and $X^3$ each represent a divalent hydrocarbon group having 11 to 19 carbon atoms and optionally having an unsaturated bond and/or a branched structure; and $R^1$ represents a hydrogen atom or a methyl group.

In formula (1), a group represented by formula (6):

 (6)

wherein $W^1$ and i each have the same definition as described above and a group represented by formula (14):

 (14)

wherein $X^1$ and j each have the same definition as described above are derived from a hydroxycarboxylic acid having 2 to 20 carbon atoms and optionally having an unsaturated bond and/or a branched structure, or a mixture of such hydroxycarboxylic acids or a polycondensation product of one or more such hydroxycarboxylic acids.

In formula (12), a group represented by formula (15):

 (15)

wherein $W^3$ and i each have the same definition as described above and a group represented by formula (16):

 (16)

wherein $X^3$ and j each have the same definition as described above are derived from a hydroxycarboxylic acid having 12 to 20 carbon atoms and optionally having an unsaturated bond and/or a branched structure, or a mixture of such hydroxycarboxylic acids or a polycondensation product of one or more such hydroxycarboxylic acids.

Examples of specific hydroxycarboxylic acids include glycolic acid, lactic acid, hydroxybutyric acid, hydroxyvaleric acid, hydroxycaproic acid, hydroxycaprylic acid, hydroxycapric acid, hydroxylauric acid, hydroxymyristic acid, hydroxypalmitic acid, ricinolic acid and castor oil fatty acid and hydrogenated products of these unsaturated hydroxycarboxylic acids, and 12-hydroxystearic acid. Where the pigment dispersion of the present invention is used for paints and pigmented photoresists using a polar solvent, a hydroxycarboxylic acid having a smaller number of carbon atoms, e.g., 2 to 11 carbon atoms, is preferably used. Where the pigment dispersion is used for an offset printing ink composition having a low polarity, a hydroxycarboxylic acid having 12 to 20 carbon atoms, preferably a hydroxycarboxylic acid having 16 to 20 carbon atoms such as ricinolic acid or castor oil fatty acid, a hydrogenated product thereof or 12-hydroxystearic acid is preferably used.

The repetition numbers i and j are integers within ranges between 1 and 30 and between 0 and 30, respectively. The optimal repetition numbers vary depending on the type of a pigment to be used, the specific surface area and particle size of the pigment, the presence or absence of a surface treatment of the pigment, the properties of a surface treatment agent of the pigment, and the polarity of a dispersion medium to be used, etc. Therefore, the repetition numbers should be optimized in each case. If the repetition number i or j exceeds the aforesaid ranges, the properties of the pigment dispersion cannot be further improved.

The group represented by formula (6) or (14) in formula (1) or the group represented by formula (15) or (16) in formula (12) can be formed, for example, by first carrying out a polycondensation of a hydroxycarboxylic acid and then carrying out a reaction of its terminal carboxyl group with the aforesaid epoxy group or, alternatively, by first carrying out a reaction of a carboxyl group of a hydroxycarboxylic acid with the aforesaid epoxy group and then further carrying out a polycondensation of a hydroxycarboxylic acid.

The polycondensation of the hydroxycarboxylic acid can be conducted at 180° to 220° C. in the presence or absence of a catalyst such as p-toluenesulfonic acid, stannous octylate, dibutyltin diacetate or tetra-n-butyl titanate while generated water is removed with an azeotropic solvent such as toluene or xylene. The reaction can be followed by measuring the molecular weight by way of GPC or by measuring the acid value.

The modified novolak resin according to the present invention must have the group represented by formula (1) or (12) in a molecule thereof. The number of the groups of formula (1) or (12) in a single molecule of the modified novolak resin is preferably in a range between 1 and 20. A novolak resin having no group of formula (1) or (12) does not offer a satisfactory dispersibility of a pigment. Even if the number of the groups exceeds the aforesaid range, satisfactory effects may be offered, but it is very difficult to control the molecular weight of a novolak resin having a larger number of phenolic rings. In practice, the upper limit of the number of the phenolic rings is 20. The optimal number of the groups varies depending on the type of a pigment to be used, the specific surface area and particle size of the pigment, the presence or absence of a surface treatment of the pigment, the properties of a surface treatment agent, the polarity of a dispersion medium to be used, and the like. Therefore, the number of the groups should be optimized in each case.

The modified novolak resin according to the present invention may have the group represented by formula (5) in its molecule. In formula (5), the oxygen atom at the left end is derived from an oxygen atom of a phenolic hydroxyl group of the novolak resin; Y represents a monovalent organic group having 1 to 20 carbon atoms and, at its bonding end, an oxygen atom or a nitrogen atom (excluding the group represented by formula (6)); and $R^{10}$ represents a hydrogen atom or a methyl group.

For formation of the group represented by formula (5), the phenolic hydroxyl group is first reacted with epichlorohydrin and/or β-methylepichlorohydrin and then with a monocarboxylic acid or a monovalent amine.

Examples of specific monocarboxylic acids include saturated fatty acids such as acetic acid, propionic acid, butyric acid, caproic acid, caprylic acid, capric acid, lauric acid, myristic acid, palmitic acid and stearic acid; unsaturated fatty acids such as oleic acid, elaidic acid, linolic acid, linolenic acid, arachidonic acid and eleostearic acid; and hydrogenated products of these unsaturated fatty acids.

Examples of specific monoamines include aliphatic primary monoamines such as methylamine, ethylamine, propylamine, butylamine, amylamine, octylamine, dodecylamine, stearylamine and benzylamine; aromatic primary monoamines such as aniline and naphthylamine; secondary monoamines derived from N-monoalkylation of these aliphatic and aromatic primary monoamines; alkanolmonoamines having a primary or secondary amino group such as ethanolamine, N-monoalkylethanolamine and diethanolamine.

The modified novolak resin according to the present invention may further contain the group represented by formula (8) or a phenolic hydroxyl group in a molecule thereof. This means that glycidyloxy group and/or 2,3-epoxy-2-methylpropyloxy group, or a phenolic hydroxyl group of the novolak resin may remain. However, it is not preferable that the modified novolak resin includes both the group of formula (8) and the phenolic hydroxyl group. This may result in gelation.

The numbers of the groups of formula (5), the groups of formula (8) and the phenolic hydroxyl groups in a molecule may each be in a range between 0 and 19. Even if the numbers exceed the aforesaid range, satisfactory effects may be offered. However, since it is very difficult to control the molecular weight of a novolak resin having a larger number of phenolic rings, and at least one group represented by formula (1) or (12) should be present, the upper limits of the numbers are each 19 in practice. The optimal numbers vary depending on the type of a pigment to be used, the specific surface area and particle size of the pigment, the presence or absence of a surface treatment of the pigment, the properties of a surface treatment agent and the polarity of a dispersion medium to be used, etc. Therefore, the numbers should be each optimized in each case.

Further, the modified novolak resin according to the present invention may be bridged intermolecularly or intramolecularly with a crosslinking group represented by formula (7). In formula (7), the oxygen atom at the right end is derived from an oxygen atom of a phenolic hydroxyl group of the novolak resin in the same or different molecule thereof; Z represents a divalent to hexavalent organic group having 1 to 40 carbon atoms and, at its bonding end, an oxygen atom or a nitrogen atom; k represents an integer in a range between 2 and 6; and $R^{11}$ represents a hydrogen atom or a methyl group.

For substitution of active hydrogen atoms of the phenolic hydroxyl groups with the intermolecular or intramolecular crosslinking group of formula (7), the phenolic hydroxyl groups are reacted with epichlorohydrin and/or β-methylepichlorohydrin, and then with a di- to hexafunctional carboxylic acid, amine (including a primary monoamine) or amino acid.

Examples of specific polyfunctional carboxylic acids include aliphatic polycarboxylic acids such as succinic acid, maleic acid, itaconic acid, cyclohexanedicarboxylic acid, adipic acid, azelaic acid, sebacic acid, 1,10-decanedicarboxylic acid, dodecenylsuccinic acid, dimer acids, 3,6-endomethylenetetrahydrophthalic acid and 3,6-methylendomethylenetetrahydrophthalic acid; aromatic polycarboxylic acids such as phthalic acid, isophthalic acid, terephthalic acid, trimellitic acid, pyromellitic acid, benzophenonetetracarboxylic acid, ethylene glycol bistrimellitate and glycerol tristrimellitate.

Examples of specific polyfunctional amines include aliphatic polyamines such as ethylenediamine, diethylenetriamine, triethylenetetramine, tetraethylenepentamine, pentaethylenehexamine, propylenediamine, (dimethylamino)propylamine, (diethylamino)propylamine, hexamethylenediamine, hexamethylenetriamine, N,N-bis (aminopropyl) methylamine, isophoronediamine, norbornanediamine, diaminodicyclohexylmethane, N-(aminoethyl)piperazine, N,N'-bis(aminoethyl)piperazine, xylylenediamine and dimerdiamines; and aromatic polyamines such as melamine, benzoguanamine, m-phenylenediamine and diaminodiphenylmethane.

Polyether diamines, N-aminoethylethanolamine, so-called polyaminoamides and the like may also be used.

The formation of the crosslinking structure can alternatively be achieved by a reaction of the epoxy group with a primary amino group which is difunctional with respect to the epoxy group. In such a case, a primary monoamine as described above may be used. An amino acid such as leucine or threonine may also be used.

The aforesaid reaction can be conducted at 60° to 160° C. in a suitable organic solvent as required in the presence of a catalyst such as an aliphatic tertiary amine, an aromatic tertiary amine or an ammonium salt of a tertiary amine as required. The reaction can be followed by measuring the molecular weight by way of GPC or by measuring the epoxy equivalent.

Since it is very difficult to control the molecular weight of a novolak resin having a large number of phenolic rings, the total number of the phenolic hydroxyl groups in a molecule of the modified novolak resin (the total number of non-substituted and substituted phenolic hydroxyl groups, hereinafter the same) is preferably not greater than 20.

The modified novolak resin offers satisfactory effects on the pigment dispersion. Particularly where the ratio of the remaining phenolic hydroxyl groups in the modified novolak resin is not greater than 5.0%, the emulsification property and printability of the resulting offset printing ink composition can be effectively improved. In contrast to the conventional pigment dispersants which excessively promote the emulsification of the ink to deteriorate the printability, the modified novolak resin offers improvement both in the dispersibility of a pigment and in the emulsification property.

There will next be described the graft copolymer according to the present invention.

The graft copolymer according to the present invention is prepared by the following method (1) or (2).

(1) 10 to 90% by mole of an ethylenic unsaturated monomer having an epoxy group represented by formula (17):

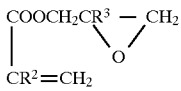  (17)

wherein $R^2$ and $R^3$ each have the same definition as described above and 10 to 90% by mole of at least one of monomers represented by formulae (18) and (19):

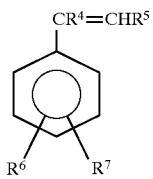  (18)

(19)

wherein $R^4$, $R^5$, $R^6$, $R^7$, $R^8$ and $R^9$ each have the same definition as described above and, as required, 0 to 80% by mole of an additional ethylenic unsaturated monomer having no functional group highly reactive to an epoxy group are polymerized with the use of a radical polymerization initiator such as a peroxide or an azo compound by an ordinary method to provide a copolymer having epoxy groups. Then, the epoxy groups of the copolymer are reacted with a carboxylic acid or an amine which will be described later.

(2) 10 to 90% by mole of a monomer represented by formula (20):

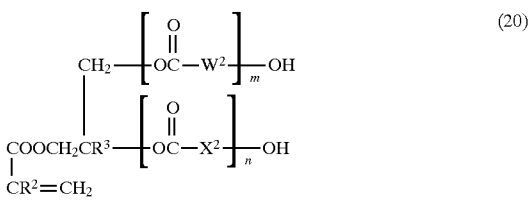  (20)

wherein $R^2$, $R^3$, $W^2$ and $X^2$ each have the same definition as described above; and m and n are an integer of 1 to 30 and an integer of 0 to 30, respectively and 10 to 90% by mole of at least one of the monomer represented by formula (18) and the monomer represented by formula (19) and, as required, 0 to 80% by mole of a monomer represented by formula (21):

  (21)

wherein $R^{13}$, $R^{14}$ and V each have the same definition as described above, and 0 to 80% by mole of an additional ethylenic unsaturated monomer having no functional group highly reactive to an epoxy group are polymerized with the use of a radical polymerization initiator such as a peroxide or an azo compound by an ordinary method.

In the method (1), the reaction of epoxy group of the copolymer with the carboxylic acid or amine giving the recurring unit represented by formula (2) or (9) is conducted at 60° to 160° C. in a solvent as required, with the use of a catalyst such as an aliphatic amine, an aromatic amine or an ammonium salt as required. In the method (2), the reaction of the epoxy group of the ethylenic unsaturated monomer represented by formula (17) with the carboxylic acid or amine is conducted under a similar condition.

In the recurring unit represented by formula (3), examples of the halogen atom for $R^5$ include chlorine atom and the like. Examples of the hydrocarbon group having 1 to 5 carbon atoms for $R^6$ and $R^7$ include alkyl groups such as methyl, ethyl, n-propyl, isopropyl, n-butyl, sec-butyl, t-butyl and pentyl. Examples of the alkoxy group having 1 to 5 carbon atoms for $R^6$ and $R^7$ include methoxy and butoxy. Examples of the aryloxy group having 6 to 10 carbon atoms for $R^6$ and $R^7$ include phenoxy and the like. Examples of the halogen atom for $R^6$ and $R^7$ include fluorine atom, chlorine atom and bromine atom.

Among the monomers used for preparation of the graft copolymer according to the present invention, the monomers represented by formula (18) are styrene and styrene derivatives. Examples of specific styrene derivatives include alkyl-substituted styrenes such as vinyltoluene, α-methylstyrene, dimethylstyrene, ethylstyrene, isopropylstyrene and t-butylstyrene; halogen-substituted styrene such as chlorostyrene, dichlorostyrene, bromostyrene and fluorostyrene; alkoxy-substituted styrenes such as methoxystyrene and butoxystyrene; aryloxy-substituted styrenes such as phenoxystyrene; and β-chlorostyrene.

Examples of specific monomers represented by formula (19) include benzyl (meth)acrylate and phenyl (meth)acrylate.

Examples of specific ethylenic unsaturated monomers represented by formula (17) and having an epoxy group include glycidyl (meth)acrylate and 2,3-epoxy-2-methylpropyl (meth)acrylate.

The additional ethylenic unsaturated monomer to be optionally used does not have any functional group highly reactive to an epoxy group, such as carboxyl group, phenolic hydroxyl group, primary amino group and secondary amino group. Examples thereof include alkyl esters of (meth) acrylic acid such as methyl (meth)acrylate, ethyl (meth) acrylate, propyl (meth)acrylate, butyl (meth)acrylate, cyclohexyl (meth)acrylate, 2-ethylhexyl (meth)acrylate, octyl (meth)acrylate, lauryl (meth)acrylate, dodecyl (meth) acrylate, cetyl (meth)acrylate, stearyl (meth)acrylate, behenyl (meth)acrylate and norbornyl (meth)acrylate; (meth) acrylates having a cyclic ether group such as tetrahydrofurfuryl (meth)acrylate; (meth)acrylates having a hydroxyl group on an aliphatic carbon such as 2-hydroxyethyl (meth)acrylate; (meth)acrylates having a tertiary amino group such as dimethylaminoethyl (meth) acrylate and diethylaminoethyl (meth)acrylate; vinyl ethers such as methyl vinyl ether, dodecyl vinyl ether and propenyl ether propylene carbonate; vinyl ethers having a hydroxyl group on an aliphatic carbon such as hydroxybutyl vinyl ether; and allyl esters of various acids such as allyl acetate.

Where the monomer represented by formula (20) or (21) derived from a reaction of the epoxy group of the ethylenic unsaturated monomer with the carboxylic acid or amine is used to provide the graft copolymer, ethylenic unsaturated monomers having a functional group highly reactive to an epoxy group such as carboxyl group, phenolic hydroxyl group, primary amino group or secondary amino group can be used.

The recurring unit represented by formula (2) or (13) in the graft copolymer according to the present invention can be obtained by a reaction of the epoxy group of a recurring unit derived from the epoxy-containing ethylenic unsaturated monomer presented by formula (17), with a hydroxycarboxylic acid having 2 to 20 carbon atoms and optionally having an unsaturated bond and/or a branched structure, a mixture of such hydroxycarboxylic acids or a polycondensation product of one or more such hydroxycarboxylic acids; or with a hydroxycarboxylic acid having 12 to 20 carbon atoms and optionally having an unsaturated bond and/or a branched structure, a mixture of such hydroxycarboxylic acids or a polycondensation product of one or more such hydroxycarboxylic acids. Alternatively, the recurring unit represented by formula (2) or (13) is derived from the monomer of formula (20) obtained by a reaction of the epoxy group of the epoxy-containing ethylenic unsaturated monomer represented by formula (17) with a hydroxycarboxylic acid having 2 to 20 carbon atoms and optionally having an unsaturated bond and/or a branched structure, a mixture of such hydroxycarboxylic acids, or a polycondensation product of one or more such hydroxycarboxylic acids; or with a hydroxycarboxylic acid having 12 to 20 carbon atoms and optionally having an unsaturated bond and/or a branched structure, a mixture of such hydroxycarboxylic acids or a polycondensation product of one or more such hydroxycarboxylic acids.

In formula (2), $W^2$ and $X^2$ each represent a divalent hydrocarbon group having 1 to 19 carbon atoms and optionally having an unsaturated bond and/or a branched structure; and $R^2$ and $R^3$ each independently represent a hydrogen atom or a methyl group. In the general formula (13), $W^4$ and $X^4$ each represent a divalent hydrocarbon group having 11 to 19 carbon atoms and optionally having an unsaturated bond and/or a branched structure; and $R^2$ and $R^3$ each independently represent a hydrogen atom or a methyl group.

In formula (2), a group represented by formula (10):

 (10)

wherein $W^2$ and p each have the same definition as described above) and a group represented by formula (22):

 (22)

wherein $X^2$ and q each have the same definition as described above are derived from a hydroxycarboxylic acid having 2 to 20 carbon atoms and optionally having an unsaturated bond and/or a branched structure, or a mixture of such hydroxycarboxylic acids or a polycondensation product of one or more such hydroxycarboxylic acids.

In formula (13), a group represented by formula (23):

 (23)

wherein $W^4$ and p each have the same definition as described above and a group represented by formula (24):

 (24)

wherein $X^4$ and q each have the same definition as described above are derived from a hydroxycarboxylic acid having 12 to 20 carbon atoms and optionally having an unsaturated bond and/or a branched structure, or a mixture of such hydroxycarboxylic acids or a polycondensation product of one or more such hydroxycarboxylic acids.

Examples of specific hydroxycarboxylic acids include glycolic acid, lactic acid, hydroxybutyric acid, hydroxyvaleric acid, hydroxycaproic acid, hydroxycaprylic acid, hydroxycapric acid, hydroxylauric acid, hydroxymyristic acid, hydroxypalmitic acid, ricinolic acid and castor oil fatty acid and hydrogenated products of these unsaturated hydroxycarboxylic acids, and 12-hydroxystearic acid. Where the pigment dispersion of the present invention is used for paints, pigmented photoresists and the like using a polar solvent, a hydroxycarboxylic acid having a smaller number of carbon atoms, e.g., 2 to 11 carbon atoms, is preferably used. Where the pigment dispersion is used for an offset printing ink composition having a low polarity, a hydroxycarboxylic acid having 12 to 20 carbon atoms, preferably a hydroxycarboxylic acid having 16 to 20 carbon atoms such as ricinolic acid or castor oil fatty acid, a hydrogenated product thereof or 12-hydroxystearic acid is preferably used.

The repetition numbers p and q are integers within ranges between 1 and 30 and between 0 and 30, respectively. The optimal repetition numbers vary depending on the type of a pigment to be used, the specific surface area and particle size of the pigment, the presence or absence of a surface treatment of the pigment, the properties of a surface treatment agent, and the polarity of a dispersion medium to be used, etc. Therefore, the numbers should be optimized in each case. If the repetition numbers p and q exceed the aforesaid ranges, the pigment dispersibility cannot be further improved.

The group represented by formula (10) or (22) in formula (2) or the group represented by formula (23) or (24) in formula (13) can be formed, for example, by first carrying out polycondensation of a hydroxycarboxylic acid and then carrying out a reaction of its terminal carboxyl group with the aforesaid epoxy group or, alternatively, by first carrying out a reaction of a carboxyl group of a hydroxycarboxylic acid with the aforesaid epoxy group and then further a polycondensation of a hydroxycarboxylic acid.

The polycondensation of the hydroxycarboxylic acid can be conducted at 180° to 220° C. in the presence or absence of a catalyst such as p-toluenesulfonic acid, stannous octylate, dibutyltin diacetate or tetra-n-butyl titanate while generated water is removed with an azeotropic solvent such as toluene or xylene. The reaction can be followed by measuring the molecular weight by way of GPC or by measuring the acid value.

In the graft copolymer according to the present invention, the arrangement of respective recurring units may be random or regular.

The graft copolymer according to the present invention must have the recurring unit represented by formula (2) and at least one of the recurring unit represented by formula (3) and the recurring unit represented by formula (4) or, alternatively, the recurring unit represented by formula (13) and at least one of the recurring unit represented by formula (3) and the recurring unit represented by formula (4).

The graft copolymer preferably contains the recurring unit of formula (2) in a proportion of at least 10% by mole, more preferably 10 to 90% by mole, and at least one recurring unit selected from the group consisting of the recurring units of formulae (3) and (4) in a proportion of at least 10% by mole, more preferably 10 to 90% by mole. Alternatively, the graft copolymer preferably contains the recurring unit of formula (13) in a proportion of at least 10% by mole, more preferably 10 to 90% by mole, and at least one recurring unit selected from the group consisting of the recurring units of formulae (3) and (4) in a proportion of at least 10% by mole, more preferably 10 to 90% by mole.

The aforesaid proportions of respective recurring units in terms of mole percentage are based on the proportions of assumed ethylenic unsaturated monomers when the graft copolymer is divided thereinto.

If the proportion of any of these recurring units is less than the predetermined mole percentage, the graft copolymer fails to offer a satisfactory dispersibility of a pigment. The optimal proportions vary depending on the type of a pigment to be used, the specific surface area and particle size of the pigment, the presence or absense of a surface treatment of the pigment, the properties of a surface treatment agent and the polarity of a dispersion medium to be used, etc. Therefore, the proportions should be optimized in each case.

The graft copolymer according to the present invention may further contain the recurring unit represented by formula (9). In formula (9), V represents a monovalent organic group having 1 to 20 carbon atoms and, at its bonding end, an oxygen atom or a nitrogen atom (excluding the group represented by formula (10)); and $R^{13}$ and $R^{14}$ each represent a hydrogen atom or a methyl group.

The recurring unit represented by formula (9) can be formed by a reaction of the epoxy group of the epoxy-containing ethylenic unsaturated monomer or the copolymer thereof, with a monocarboxylic acid or a monoamine.

Examples of specific monocarboxylic acids include saturated fatty acids such as acetic acid, propionic acid, butyric acid, caproic acid, caprylic acid, capric acid, lauric acid, myristic acid, palmitic acid and stearic acid; unsaturated fatty acids such as oleic acid, elaidic acid, linolic acid, linolenic acid, arachidonic acid and eleostearic acid; and hydrogenated products of these unsaturated fatty acids.

Examples of specific monoamines include aliphatic primary monoamines such as methylamine, ethylamine, propylamine, butylamine, amylamine, octylamine, dodecylamine, stearylamine and benzylamine; aromatic primary monoamines such as aniline and naphthylamine; secondary monoamines derived from N-monoalkylation of these aliphatic and aromatic primary monoamines; alkanolmonoamines having a primary or secondary amino group such as ethanolamine, N-monoalkylethanolamine and diethanolamine.

The graft copolymer according to the present invention may have the recurring unit represented by formula (11). This means that glycidyloxy group and/or 2,3-epoxy-2-methylpropyloxy group introduced by the ethylenic unsaturated monomer having an epoxy group may remain.

The graft copolymer according to the present invention offers satisfactory effects on the dispersibility of a pigment. Particularly where the graft copolymer is used for an offset printing ink composition, the graft copolymer offers excellent effects on the improvement in the printability, which is attributable to an improved emulsification property of the ink. In contrast to the conventional pigment dispersants which promote the emulsification of the ink to deteriorate the printability, the graft copolymer offers improvement both in the dispersibility of a pigment and in the emulsification property.

The graft copolymer according to the present invention preferably has a weight average molecular weight of 3,000 to 100,000. Even if the molecular weight is lower than 3,000, a satisfactory dispersibility of a pigment may be ensured, but the control of the polymerization is difficult. In addition, the emulsification property is deteriorated due to an influence of terminal groups introduced due to a large amount of a polymerization initiator or chain transfer agent used. On the other hand, if the molecular weight is higher than 100,000, a sufficient dispersibility of a pigment cannot be ensured.

Pigments to be used in the present invention are common inorganic or organic pigments. Examples thereof include inorganic pigments such as titanium dioxide, barium sulfate, calcium carbonate and magnetic iron oxide; organic pigments such as azo pigments, lake pigments, phthalocyanines, isoindolines, anthraquinones and quinacridones; and carbon black.

Usable as the binder resin in the present invention is any of various binder resins known to be used in the fields of paints, pigmented photoresists and ink compositions.

The pigment dispersion comprising the pigment, the pigment dispersant and optionally the binder resin in accordance with the present invention preferably contains as the pigment dispersant at least 0.2 part by weight of the modified novolak resin and/or the graft copolymer each having in a molecule thereof an aromatic ring and a structure given by ring opening of an epoxy group by a carboxyl group of a hydroxycarboxylic acid or a derivative thereof, with respect to 100 parts by weight of the pigment. If the content of the pigment dispersant is less than 0.2 part by weight, a satisfactory dispersibility of a pigment cannot be ensured. Where the pigment dispersion of the present invention is to be used for an offset printing ink composition, the pigment dispersion preferably contains as the pigment dispersant 0.2 to 50 parts by weight, preferably 1 to 30 parts by weight of the modified novolak resin and/or the graft copolymer each having in a molecule thereof an aromatic ring and a structure given by ring opening of an epoxy group by a carboxyl group of a hydroxycarboxylic acid or a derivative thereof, with respect to 100 parts by weight of the pigment. Even if the content of the pigment dispersant exceeds 50 parts by weight, the pigment dispersibility is not further improved.

The pigment dispersibility varies depending on the type of a pigment to be used, the specific surface area and particle size of the pigment, the presence or absence of a surface treatment of the pigment, the properties of a surface treatment agent and the polarity of a dispersion medium to be used, etc. The content of the pigment dispersant should be optimized in each case.

The pigment dispersion of the present invention can be prepared by mixing a pigment, a pigment dispersant according to the present invention, and optionally a binder resin and/or a solvent by use of a bead mill, a pearl mill, a ball mill, a two-roll mill, a three-roll mill, a pressure kneader, a flusher or the like.

The pigment dispersion of the present invention is preferably used as an ink base for various printing inks, particularly, as an ink base for offset printing ink.

For preparation of the offset printing ink composition using the pigment dispersion of the present invention, a known binder resin can be used. Examples of the binder resin include various alkyd resins, phenolic resins, petroleum resins, rosin ester resins and polyester resins, and modified resins of these resins. Usable as a solvent are vegetable oils such as linseed oil, tung oil and soybean oil, and mineral oils such as naphthenic hydrocarbons, n-paraffin, isoparaffin and aromatic solvents. Further, additives as a dryer, a gelling agent, a drying retardant and an anti-oxidant may be used as required.

The offset printing ink composition of the present invention contains the following ingredients in the following preferable proportions.

| Ingredients | % by weight |
| --- | --- |
| Binder resin | 20 to 50 |
| Vegetable oil | 0 to 60 |
| Mineral oil | 0 to 60 |
| Pigment | 2 to 60 |
| Pigment dispersant | 0.004 to 30 (preferably 0.02 to 18) |

In the aforesaid ink composition, the total proportion of the vegetable oil and the mineral oil is preferably 20 to 60% by weight.

Where the pigment dispersion of the present invention is used in applications for paints, pigmented photoresists and the like other than printing ink compositions, any of various binder resins, solvents and additives known to be used in the applications may be used.

The present invention will be more fully described by way of Examples and Comparative Examples thereof. It is to be understood that the present invention is not limited to these Examples, and various changes and modifications may be made in the invention without departing from the spirit and scope thereof.

Preparation of Pigment Dispersants

Pigment Dispersant 1

A mixture of 35 parts by weight of glycidyl phenyl ether, 70 parts by weight of 12-hydroxystearic acid and 0.1 part by weight of tetraethylammonium bromide (catalyst) was stirred at 130° to 150° C. for three hours under a current of nitrogen. After the reaction, the catalyst was filtered away under reduced pressure to afford a viscous liquid having an acid value of not higher than 1 (mgKOH/g, hereinafter the same). A mixture of 60 parts by weight of the viscous liquid, 50 parts by weight of phenol, 40 parts by weight of formalin and 5 parts by weight of oxalic acid dihydrate was stirred at 95° to 100° C. for 15 hours. In turn, water and unreacted components were removed under reduced pressure to afford a modified novolak resin (Pigment Dispersant 1) of a pale brown solid at room temperature. The weight average molecular weight of the modified novolak resin was 3,500. The weight average molecular weight was measured by way of GPC (hereinafter the same). The ratio (theoretical value, hereinafter the same) of remaining phenolic hydroxyl groups was 80%.

Pigment Dispersant 2

A mixture of 40 parts by weight of the modified novolak resin (Pigment Dispersant 1) obtained in the aforesaid preparation process, 60 parts by weight of 12-hydroxystearic acid, 10 parts by weight of xylene and 0.1 part by weight of tetra-n-butyl titanate was stirred at 180° to 200° C. for 12 hours under a current of nitrogen while allowing generated water to be separated by azeotropic distillation. In turn, xylene was removed under reduced pressure to afford another modified novolak resin (Pigment Dispersant 2) of a pale brown viscous liquid. The weight average molecular weight of the modified novolak resin was 7,000. The ratio of remaining phenolic hydroxyl groups was 80%.

Pigment Dispersant 3

A modified novolak resin (Pigment Dispersant 3) having a weight average molecular weight of 10,000 was prepared in substantially the same preparation process for Pigment Dispersant 2 except for the use of 100 parts by weight of 12-hydroxystearic acid. The ratio of remaining phenolic hydroxyl groups was 80%.

Pigment Dispersant 4

A mixture of 100 parts by weight of 12-hydroxystearic acid, 10 parts by weight of xylene and 0.1 part by weight of tetra-n-butyl titanate was stirred at 180° to 200° C. for seven hours under a current of nitrogen while allowing generated water to be separated by azeotropic distillation. In turn, xylene was removed under reduced pressure to afford a polyester A of a pale brown polymer having an acid value of 30 and a weight average molecular weight of 4,500. A mixture of 100 parts by weight of the polyester A, 8 parts by weight of glycidyl phenyl ether and 0.1 part by weight of tetraethylammonium bromide (catalyst) was stirred at 130° to 150° C. for three hours under a current of nitrogen, and the catalyst was filtered away under reduced pressure to afford a pale brown viscous liquid having an acid value of not higher than 1. A mixture of 100 parts by weight of the pale brown viscous liquid, 10 parts by weight of phenol, 10 parts by weight of formalin and 0.5 part by weight of oxalic acid dihydrate was stirred at 95° to 100° C. for 15 hours, and then the reaction mixture was subjected to distillation under reduced pressure to afford a modified novolak resin (Pigment Dispersant 4) as a residue. The weight average molecular weight of the modified novolak resin was 13,000, and the ratio of remaining phenolic hydroxyl groups was 67%.

Pigment Dispersant 5

A modified novolak resin (Pigment Dispersant 5) having a weight average molecular weight of 10,000 was prepared in substantially the same preparation process for Pigment Dispersant 4 except that 80 parts by weight of a polyester synthesized by employing a different reaction time, and having an acid value of 37 and a weight average molecular weight of 4,100 was used instead of the polyester A having an acid value of 30. The ratio of remaining phenolic hydroxyl groups was 62%.

Pigment Dispersant 6

A modified novolak resin (Pigment Dispersant 6) having a weight average molecular weight of 7,000 was prepared in substantially the same preparation process for Pigment Dispersant 4 except that 50 parts by weight of a polyester synthesized by employing a different reaction time, and having an acid value of 60 and a weight average molecular weight of 3,000 was used instead of the polyester A having an acid value of 30. The ratio of remaining phenolic hydroxyl groups was 52%.

Pigment Dispersant 7

A modified novolak resin (Pigment Dispersant 7) having a weight average molecular weight of 6,000 was prepared in substantially the same preparation process for Pigment Dispersant 1 except that 27 parts by weight of resorcin diglycidyl ether was used instead of glycidyl phenyl ether. The ratio of remaining phenolic hydroxyl groups was 78%.

Pigment Dispersant 8

A modified novolak resin (Pigment Dispersant 8) having a weight average molecular weight of 3,700 was prepared in substantially the same preparation process for Pigment Dispersant 1 except that 40 parts by weight of 1,2-epoxy-2-methyl-3-phenoxypropane was used instead of glycidyl phenyl ether. The ratio of remaining phenolic hydroxyl groups was 80%.

Pigment Dispersants 9 and 10

Modified novolak resins (Pigment Dispersants 9 and 10) having weight average molecular weights of 24,000 and 19,000, respectively, were prepared in substantially the same preparation process for Pigment Dispersant 3 except that 50 parts by weight of 1,3,5-trihydroxybenzene triglycidyl ether and 70 parts by weight of 2,2'-dihydroxybiphenyl diglycidyl ether are respectively used instead of glycidyl phenyl ether. The ratios of remaining phenolic hydroxyl groups in the modified novolak resins (Pigment Dispersants 9 and 10) were 78% and 80%, respectively.

Pigment Dispersant 11

A mixture of 30 parts by weight of an epoxy-modified novolak resin (Epikote 154 available from Yuka Shell Epoxy Co., Ltd.), 75 parts by weight of a polyester derived from polycondensation of 12-hydroxystearic acid and having an acid value of 30 and a weight average molecular weight 4,500, 35 parts by weight of stearic acid and 0.2 part by weight of tetraethylammonium bromide (catalyst) was stirred at 130° to 150° C. for three hours under a current of nitrogen, and then the catalyst was filtered away under reduced pressure to afford a modified novolak resin (Pigment Dispersant 11) having a weight average molecular weight of 8,000. The ratio of remaining phenolic hydroxyl groups was 0%.

Pigment Dispersant 12

A modified novolak resin (Pigment Dispersant 12) having a weight average molecular weight of 7,000 was prepared in substantially the same preparation process for Pigment Dispersant 11 except that 8 parts by weight of acetic acid was used instead of stearic acid. The ratio of remaining phenolic hydroxyl groups was 0%.

Pigment Dispersant 13

A modified novolak resin (Pigment Dispersant 13) having a weight average molecular weight of 7,000 was prepared in substantially the same preparation process for Pigment Dispersant 11 except that 30 parts by weight of stearylamine was used instead of stearic acid. The ratio of remaining phenolic hydroxyl groups was 0%.

Pigment Dispersant 14

A modified novolak resin (Pigment Dispersant 14) having a weight average molecular weight of 16,000 was prepared in substantially the same preparation process for Pigment Dispersant 11 except that 3 parts by weight of succinic acid and 20 parts by weight of stearic acid were used instead of 35 parts by weight of stearic acid. The ratio of remaining phenolic hydroxyl groups was 0%.

Pigment Dispersant 15

A modified novolak resin (Pigment Dispersant 15) having a weight average molecular weight of 17,000 was prepared in substantially the same preparation process for Pigment Dispersant 11 except that 3 parts by weight of succinic acid, 10 parts by weight of stearylamine and 10 parts by weight of stearic acid were used instead of 35 parts by weight of stearic acid. The ratio of remaining phenolic hydroxyl groups was 0%.

Pigment Dispersant 16

A mixture of 100 parts by weight of 12-hydroxystearic acid, 10 parts by weight of xylene and 0.1 part by weight of tetra-n-butyl titanate was allowed to undergo a polycondensation at 180° to 200° C. under a current of nitrogen while generated water was removed by azeotropic distillation. When the acid value became a predetermined value, xylene was removed to afford a polyester B of a pale brown polymer having an acid value of 33 and a weight average molecular weight of 4,400. In turn, 74.3 parts by weight of the polyester B and 25.7 parts by weight of a copolymer of styrene and glycidyl methacrylate (80/20 by mole ratio) as an epoxy-containing copolymer were reacted at 130° to 150° C. in 40 parts by weight of dimethylformamide as a solvent. When the amounts of remaining carboxyl groups and epoxy groups which were measured as the acid value and epoxy equivalent were reduced to measurable limits, the solvent was removed under reduced pressure to afford a graft copolymer (Pigment Dispersant 16). The weight average molecular weight of the graft copolymer was 35,000.

Pigment Dispersant 17

A graft copolymer (Pigment Dispersant 17) having a weight average molecular weight of 9,000 was prepared in substantially the same preparation process for Pigment Dispersant 16 except that 39.5 parts by weight of a polyester synthesized by employing a different reaction time, and having an acid value of 62 and a weight average molecular weight of 2,900 was used instead of the polyester B having an acid value of 33.

Pigment Dispersant 18

A graft copolymer (Pigment Dispersant 18) having a weight average molecular weight of 24,000 was prepared in substantially the same preparation process for Pigment Dispersant 16 except that 16.1 parts by weight of another copolymer of styrene and glycidyl methacrylate (67/33 by mole ratio) was used instead of the copolymer of styrene and glycidyl methacrylate (80/20 by mole ratio).

Pigment Dispersant 19

A graft copolymer (Pigment Dispersant 19) having a weight average molecular weight of 36,000 was prepared in substantially the same preparation process for Pigment Dispersant 16 except that 7.7 parts by weight of another copolymer of styrene and glycidyl methacrylate (20/80 by mole ratio) was used instead of the copolymer of styrene and glycidyl methacrylate (80/20 by mole ratio).

Pigment Dispersant 20

A graft copolymer (Pigment Dispersant 20) having a weight average molecular weight of 24,000 was prepared in substantially the same preparation process for Pigment Dispersant 16 except that 17.4 parts by weight of a copolymer of βp-chlorostyrene and glycidyl methacrylate (67/33 by mole ratio) was used instead of the copolymer of styrene and glycidyl methacrylate (80/20 by mole ratio).

Pigment Dispersant 21

A graft copolymer (Pigment Dispersant 21) having a weight average molecular weight of 26,000 was prepared in substantially the same preparation process for Pigment Dispersant 16 except that 19.3 parts by weight of a copolymer of p-chlorostyrene and glycidyl methacrylate (67/33 by mole ratio) was used instead of the copolymer of styrene and glycidyl methacrylate (80/20 by mole ratio).

Pigment Dispersant 22

A graft copolymer (Pigment Dispersant 22) having a weight average molecular weight of 25,000 was prepared in substantially the same preparation process for Pigment Dispersant 16 except that 19.3 parts by weight of a copolymer of β-chlorostyrene and glycidyl methacrylate (67/33 by mole ratio) was used instead of the copolymer of styrene and glycidyl methacrylate (80/20 by mole ratio).

Pigment Dispersant 23

A graft copolymer (Pigment Dispersant 23) having a weight average molecular weight of 26,000 was prepared in substantially the same preparation process for Pigment Dispersant 16 except that 18.7 parts by weight of a copolymer of dimethylstyrene and glycidyl methacrylate (67/33 by mole ratio) was used instead of the copolymer of styrene and glycidyl methacrylate (80/20 by mole ratio).

Pigment Dispersant 24

A graft copolymer (Pigment Dispersant 24) having a weight average molecular weight of 28,000 was prepared in substantially the same preparation process for Pigment Dispersant 16 except that 23.0 parts by weight of a copolymer of benzyl methacrylate and glycidyl methacrylate (67/33 by mole ratio) was used instead of the copolymer of styrene and glycidyl methacrylate (80/20 by mole ratio).

Pigment Dispersant 25

A graft copolymer (Pigment Dispersant 25) having a weight average molecular weight of 25,000 was prepared in substantially the same preparation process for Pigment Dispersant 16 except that 16.7 parts by weight of a copolymer of styrene and 2,3-epoxy-2-methylpropyl methacrylate (67/33 by mole ratio) was used instead of the copolymer of styrene and glycidyl methacrylate (80/20 by mole ratio).

Pigment Dispersant 26

A graft copolymer (Pigment Dispersant 26) having a weight average molecular weight of 19,000 was prepared in substantially the same preparation process for Pigment Dispersant 16 except that 15.8 parts by weight of a copolymer of styrene, glycidyl methacrylate and methyl methacrylate (57/34/9 by mole ratio) was used instead of the copolymer of styrene and glycidyl methacrylate (80/20 by mole ratio).

Pigment Dispersant 27

A graft copolymer (Pigment Dispersant 27) having a weight average molecular weight of 34,000 was prepared in substantially the same preparation process for Pigment Dispersant 16 except that 65.3 parts by weight of the polyester B having an acid value of 33 and 1.6 parts by weight of 12-hydroxystearic acid was used instead of 74.3 parts by weight of the polyester B.

Pigment Dispersant 28

A graft copolymer (Pigment Dispersant 28) having a weight average molecular weight of 19,000 was prepared in substantially the same preparation process for Pigment Dispersant 18 except that 66.5 parts by weight of the polyester B having an acid value of 33 was used instead of 74.3 parts by weight of the polyester B. There remained 3.1% by mole of a recurring unit having an epoxy group on a monomer basis.

Pigment Dispersant 29

In a reaction vessel, 86.4 parts by weight of a polyester derived from polycondensation of 12-hydroxystearic acid and having an acid value of 62 and a weight average molecular weight of 2,900, 13.6 parts by weight of glycidyl methacrylate and 40 parts by weight of dimethylformamide (solvent) were reacted at 120° C. for three hours under a current of nitrogen. Then, the solvent was removed under reduced pressure to afford a polyester having a methacryloyl terminal group. In turn, 52.8 parts by weight of the polyester and 47.2 parts by air weight of styrene (10/90 by mole ratio) were polymerized with azobisisobutyronitrile as an initiator to afford a graft copolymer (Pigment Dispersant 29) having a weight average molecular weight of 12,000.

Preparation of Comparative Pigment Dispersants

Pigment Dispersant 30

A mixture of 60 parts by weight of phenol, 40 parts by weight of formalin and 5 parts by weight of oxalic acid dihydrate was stirred at 95° to 100° C. for five hours, and then unreacted components and water were removed under reduced pressure to afford a novolak resin (Pigment Dispersant 30) having a weight average molecular weight of 6,000. The ratio of remaining phenolic hydroxyl groups was 100%.

Pigment Dispersant 31

The epoxy-modified novolak resin (Epikote 154) used in the preparation process for Pigment Dispersant 11 was employed as Pigment Dispersant 33. The ratio of remaining phenolic hydroxyl groups was 0%.

Pigment Dispersant 32

The polymer B with an acid value of 33 used in the preparation process for Pigment Dispersant 16 was employed as Pigment Dispersant 32.

Pigment Dispersant 33

The copolymer of styrene and glycidyl methacrylate (80/20 by mole ratio) used in the preparation process for Pigment Dispersant 16 was employed as Pigment Dispersant 33.

Pigment Dispersant 34

A pigment dispersant commercially available from Imperial Chemical Industries Ltd. under trade name of SOLSPERSE 17000 was employed as Pigment Dispersant 34.

Inks for offset printing

EXAMPLE 1 TO 40 AND COMPARATIVE EXAMPLES 1 TO 5

Offset printing ink bases of the following formulation were prepared by using Pigment Dispersants 1 to 29 and Pigment Dispersants 30 to 34 (Comparative Pigment Dispersants) in proportions relative to a pigment as shown in Table 1. Copper phthalocyanine was used as the pigment, and Solvent No. 5 available from NIPPON OIL COMPANY, LTD. was used as a solvent. A resin varnish A (resin concentration: 55% by weight) was prepared by dissolving a rosin-modified phenolic resin (Tespol 1355 available from Hitachi Kasei Polymer Co., Ltd.) in a mixture of linseed oil and Solvent No. 5 under heating. The content of the resin varnish A was changed depending on the content of the pigment dispersant so that the total amount of the ingredients for the ink base was 100 parts by weight.

| Formulation of Ink Base | |
|---|---|
| Ingredients | Parts by weight |
| Pigment | 40 |
| Pigment dispersant | 1.2 to 8 |
| Resin varnish A | 52.8 to 46 |
| Solvent | 6 |

The offset printing ink bases were each prepared by fully mixing the aforesaid ingredients and then milling the mixture by means of three-roll mill.

The ink bases thus prepared were used for preparation of offset printing inks of the following formulation. A polyethylene wax compound available from Shamrock Chemicals Corp. was used as a wax, and Solvent No. 5 available from NIPPON OIL COMPANY, LTD. was used as a solvent. A resin varnish B (resin concentration: 55% by weight) was prepared by dissolving a rosin-modified phenolic resin (Tespol 1355 available from Hitachi Kasei Polymer Co., Ltd.) in a mixture of linseed oil and Solvent No. 5 under heating.

| Formulation of Ink | |
|---|---|
| Ingredients | Parts by weight |
| Offset printing ink base | 40 |
| REsin varnish B | 50 |
| Wax | 5 |
| Solvent | 5 |

Evaluation Tests

The properties and performances of the offset printing ink bases and offset printing inks thus prepared were evaluated. The results are shown in Table 1. It is noted that Comparative Example 6 did not employ any pigment dispersant, but employed an equivalent amount of the resin varnish instead.

(1) Viscosity

By means of a cone-plate type rotary viscometer (produced by Rheometrics Scientific, Inc.), the yield value (Pa) of each of the offset printing ink bases was measured at 25° C., and the viscosity (Pa.s) thereof was measured at a shear rate of 10.0 /ls. An offset printing ink base having lower viscosity and yield value is more preferred.

(2) Tinting color strength

Each offset ink base was diluted with a white ink. The tinting color strength was determined on the basis of the amount of the added white ink in comparison with the ink containing no pigment dispersant (Comparative Example 6) regarded as 100%.

(3) Storage stability

The offset printing ink bases and the offset printing inks were stored in a bath thermostated at 25° C. for one month. The storage stability of each of the ink bases and inks was evaluated on the basis of a difference in the viscosity measured before and after the storage. Those exhibiting almost no viscosity increase were rated at "3", those exhibiting a little viscosity increase were rated at "2", and those exhibiting a remarkable viscosity increase were rated at "1".

(4) Printability

A press trial was performed on an actual sheet fed press made by Mitsubishi Heavy Industries Ltd. by using the respective offset printing inks, and the printability of each offset ink was evaluated on the basis of the water allowance, flow property of emulsified ink, transferability of ink, and scumming on printed paper. Those offering a wide water allowance and providing for a high-definition image were rated at "4"; those offering a wide water allowance and providing for an acceptable image were rated at "3"; those offering a narrow water allowance and providing for a scummed image were rated at "2"; and those exhibiting no suitability for the offset printing were rated at "1".

As can be seen from Table 1, the offset printing ink bases of the present invention employing as the pigment dispersant a modified novolak resin and/or a graft copolymer having an aromatic ring and a structure given by ring opening of an epoxy group by a carboxyl group of a hydroxycarboxylic acid or a derivative thereof exhibited a reduced viscosity, a reduced yield value and an improved color strength. Further, the ink bases of the present invention were excellent in the storage stability, and offered an improved pigment dispersibility. On the other hand, the ink bases of Comparative Examples offered an unsatisfactory pigment dispersibility. As apparent from a comparison between Examples and Comparative Examples, the pigment dispersant comprising the unmodified novolak resin, or the unmodified copolymer or polyester alone did not offer a pigment dispersibility comparable to the pigment dispersants comprising the modi-

TABLE 1

| | | Offset printing ink base | | | | |
|---|---|---|---|---|---|---|
| | Pigment Dispersant | Proportion of pigment dispersant to pigment (% by weight) | Viscosity (Pa.s) | Yield value (Pa) | Tinting color strength (%) | Offset printing ink base/Ink Storage stability | Offset printing ink Printability |

| Ex. | | | | | | | |
|---|---|---|---|---|---|---|---|
| 1 | 1 | 10 | 330 | 43 | 110 | 3 | 3 |
| 2 | 2 | 10 | 310 | 40 | 111 | 3 | 4 |
| 3 | 3 | 10 | 300 | 39 | 112 | 3 | 4 |
| 4 | 4 | 10 | 300 | 39 | 112 | 3 | 4 |
| 5 | 5 | 10 | 310 | 39 | 111 | 3 | 4 |
| 6 | 6 | 10 | 300 | 40 | 111 | 3 | 4 |
| 7 | 7 | 3 | 400 | 95 | 109 | 3 | 3 |
| 8 | 7 | 10 | 320 | 43 | 110 | 3 | 3 |
| 9 | 7 | 20 | 250 | 28 | 112 | 3 | 4 |
| 10 | 8 | 10 | 330 | 43 | 110 | 3 | 4 |
| 11 | 9 | 10 | 290 | 38 | 112 | 3 | 4 |
| 12 | 10 | 10 | 300 | 39 | 111 | 3 | 4 |
| 13 | 11 | 3 | 380 | 82 | 110 | 3 | 4 |
| 14 | 11 | 10 | 270 | 36 | 112 | 3 | 4 |
| 15 | 11 | 20 | 190 | 16 | 113 | 3 | 4 |
| 16 | 12 | 10 | 280 | 35 | 112 | 3 | 4 |
| 17 | 13 | 10 | 260 | 33 | 113 | 3 | 4 |
| 18 | 14 | 3 | 310 | 67 | 113 | 3 | 4 |
| 19 | 14 | 10 | 230 | 31 | 115 | 3 | 4 |
| 20 | 14 | 20 | 110 | 11 | 117 | 3 | 4 |
| 21 | 15 | 3 | 310 | 65 | 115 | 3 | 4 |
| 22 | 15 | 10 | 230 | 30 | 116 | 3 | 4 |
| 23 | 15 | 20 | 100 | 10 | 117 | 3 | 3 |
| 24 | 16 | 10 | 330 | 40 | 112 | 3 | 4 |
| 25 | 17 | 10 | 400 | 95 | 108 | 3 | 3 |
| 26 | 18 | 3 | 390 | 90 | 108 | 3 | 3 |
| 27 | 18 | 10 | 310 | 32 | 114 | 3 | 4 |
| 28 | 18 | 20 | 290 | 25 | 116 | 3 | 4 |
| 29 | 19 | 10 | 300 | 30 | 114 | 3 | 4 |
| 30 | 20 | 10 | 350 | 48 | 110 | 3 | 4 |
| 31 | 21 | 10 | 340 | 45 | 110 | 3 | 4 |
| 32 | 22 | 10 | 350 | 47 | 110 | 3 | 4 |
| 33 | 23 | 10 | 340 | 44 | 110 | 3 | 4 |
| 34 | 24 | 10 | 350 | 50 | 110 | 3 | 4 |
| 35 | 25 | 10 | 340 | 40 | 110 | 3 | 4 |
| 36 | 26 | 10 | 350 | 51 | 110 | 3 | 4 |
| 37 | 27 | 10 | 350 | 43 | 112 | 3 | 4 |
| 38 | 28 | 10 | 330 | 35 | 114 | 3 | 4 |
| 39 | 29 | 10 | 410 | 97 | 108 | 3 | 3 |
| 40 | 11/18 | 5/5 | 290 | 31 | 113 | 3 | 4 |
| Com. Ex. | | | | | | | |
| 1 | 30 | 10 | 630 | 620 | 100 | 1 | 1 |
| 2 | 31 | 10 | 600 | 620 | 100 | 1 | 1 |
| 3 | 32 | 10 | 610 | 580 | 100 | 1 | 1 |
| 4 | 33 | 10 | 620 | 650 | 100 | 1 | 1 |
| 5 | 34 | 10 | 340 | 440 | 110 | 2 | 2 |
| 6 | — | — | 760 | 780 | 100 | 1 | 1 | fied novolak resin and/or the graft copolymer according to the present invention. The inks containing as the pigment dispersant the modified novolak resin and/or the graft copolymer according to the present invention were excellent in the emulsification property and the printability as well as in the pigment dispersibility. On the other hand, the pigment dispersant of Comparative Example 5 exhibited a fair pigment dispersibility, but the ink containing the pigment dispersant offered an unsatisfactory printability.

In addition to the materials and ingredients used in Examples, other materials and ingredients can be used in Examples as set forth in the specification to obtain substantially the same results.

The pigment dispersion of the present invention which contains a modified novolak resin and/or a graft copolymer having an aromatic ring and a structure given by ring opening of an epoxy group by a carboxyl group of a hydroxycarboxylic acid or a derivative thereof provides for an offset printing ink base which is capable of containing a pigment finely dispersed therein in a high concentration and exhibits a high fluidity, a high color strength and an excellent storage stability. Further, the offset printing ink of the present invention which contains the modified novolak resin and/or the graft copolymer offers a satisfactory printability. Thus, the present invention provides a high quality offset printing ink which can be produced with a drastically improved efficiency in comparison with the conventional offset printing inks.

What is claimed is:

1. A pigment dispersion comprising a pigment, a pigment dispersant, a solvent and optionally a binder resin;

the pigment dispersion comprising as the pigment dispersant at least 0.2 part by weight of a copolymer (B) relative to 100 parts by weight of the pigment, the copolymer (B) having a weight average molecular weight of 3,000 to 100,000 and consisting essentially of 10 to 90% by mole of a recurring unit represented by formula (2), 10 to 90% by mole of at least one recurring unit selected from the group consisting of recurring units represented by formulae (3) and (4):

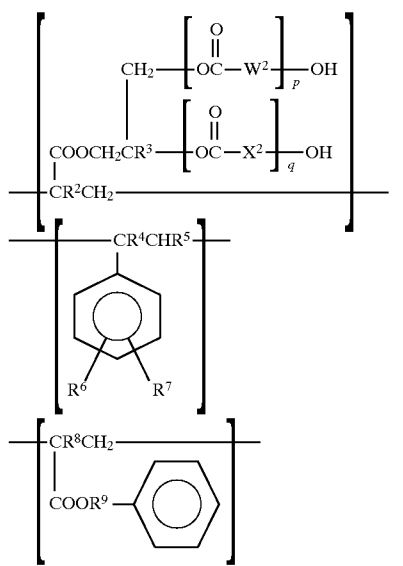

wherein $W^2$ and $X^2$ are independently each a divalent hydrocarbon group having 1 to 19 carbon atoms; p and q are an integer of 1 to 30 and an integer of 0 to 30, respectively; $R^2$, $R^3$ and $R^4$ are independently each a hydrogen atom or a methyl group; $R^5$ is a hydrogen atom or a halogen atom; $R^6$ and $R^7$ are independently each a hydrogen atom, a hydrocarbon group having 1 to 5 carbon atoms, an alkoxy group having 1 to 5 carbon atoms, an aryloxy group having 6 to 10 carbon atoms or a halogen atom; $R^8$ is a hydrogen atom or a methyl group; and $R^9$ is a direct bond or a methylene group, and 0 to 80% by mole of a recurring unit derived from an ethylenic unsaturated monomer having no functional group highly reactive to an epoxy group selected from the group consisting of an alkyl ester of (meth)acrylic acid, a (meth)acrylate having a cyclic ether group, a (meth)acrylate having a hydroxyl group on an aliphatic carbon, a (meth) acrylate having a tertiary amino group, an alkyl vinyl ether, a vinyl ether having a hydroxyl group on an aliphatic carbon and an allyl ester of an acid.

2. The pigment dispersion of claim 1, wherein the copolymer (B) further contains, in a molecule thereof, at least one recurring unit represented by formula (9):

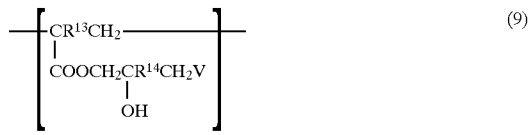

wherein V is a monovalent organic group having 1 to 20 carbon atoms and, at its bonding end, an oxygen atom or a nitrogen atom (excluding a group represented by formula (10):

wherein $W^2$ and p each have the same definition as recited in claim 1); and $R^{13}$ and $R^{14}$ are independently each a hydrogen atom or a methyl group.

3. The pigment dispersion of claim 1 or 2, wherein the copolymer (B) further contains, in a molecule thereof, at least one recurring unit represented by formula (11):

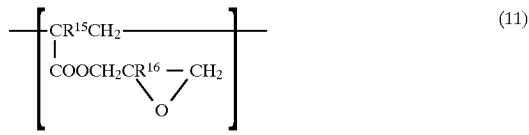

wherein $R^{15}$ and $R^{16}$ are independently each a hydrogen atom or a methyl group.

4. The pigment dispersion of claim 1 or 2, wherein the recurring unit represented by formula (2) is a recurring unit represented by formula (13):

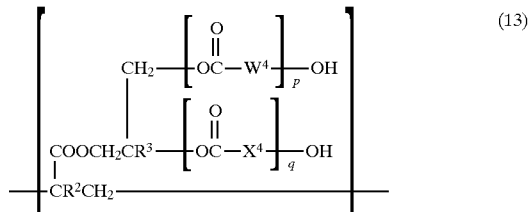

wherein $W^4$ and $X^4$ are independently each a divalent hydrocarbon group having 11 to 19 carbon atoms; p and q are an integer of 1 to 30 and an integer of 0 to 30, respectively; and $R^2$ and $R^3$ are independently each a hydrogen atom or a methyl group.

5. An ink composition for offset printing comprising a pigment dispersion, a binder resin and a solvent;

the pigment dispersion comprising a pigment, a pigment dispersant, a solvent and optionally a binder resin;

the pigment dispersion comprising as the pigment dispersant at least 0.2 part by weight of a copolymer (B) relative to 100 parts by weight of the pigment, the copolymer (B) having a weight average molecular weight of 3,000 to 100,000 and consisting essentially of 10 to 90% by mole of a recurring unit represented by formula (13), 10 to 90% by mole of at least one recurring unit selected from the group consisting of recurring units represented by formulae (3) and (4):

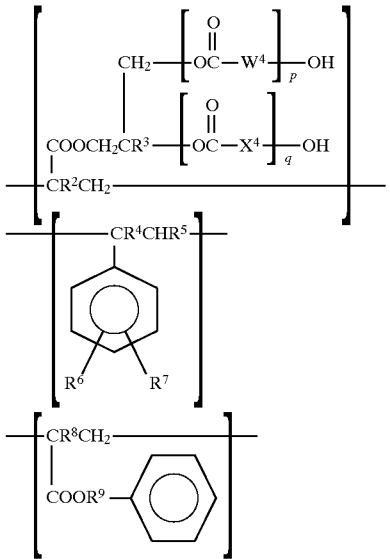

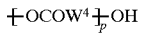

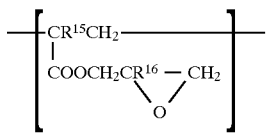

wherein $W^4$ and $X^4$ are independently each a divalent hydrocarbon group having 11 to 19 carbon atoms; p and q are an integer of 1 to 30 and an integer of 0 to 30, respectively; $R^2$, $R^3$ and $R^4$ are independently each a hydrogen atom or a methyl group; R5 is a hydrogen atom or a halogen atom; $R^6$ and $R^7$ are independently each a hydrogen atom, a hydrocarbon group having 1 to 5 carbon atoms, an alkoxy group having 1 to 5 carbon atoms, an aryloxy group having 6 to 10 carbon atoms or a halogen atom; $R^8$ is a hydrogen atom or a methyl group; and $R^9$ is a direct bond or a methylene group, and 0 to 80% by mole of a recurring unit derived from an ethylenic unsaturated monomer having no functional group highly reactive to an epoxy group selected from the group consisting of an alkyl ester of (meth)acrylic acid, a (meth)acrylate having a cyclic ether group, a (meth)acrylate having a hydroxyl group on an aliphatic carbon, a (meth)acrylate having a tertiary amino group, an alkyl vinyl ether, a vinyl ether having a hydroxyl group on an aliphatic carbon and an allyl ester of an acid.

6. The ink composition claim 5, wherein the copolymer (B) further contains, in a molecule thereof, at least one recurring unit represented by formula (9)

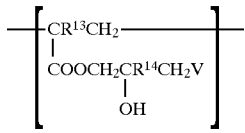

wherein V is a monovalent organic group having 1 to 20 carbon atoms and, at its bonding end, an oxygen atom or a nitrogen atom (excluding a group represented by formula (23):

$$\left[ OCOW^4 \right]_p OH \qquad (23)$$

wherein $W^4$ and p each have the same definition as recited in claim 5; and $R^{13}$ and $R^{14}$ are independently each a hydrogen atom or a methyl group.

7. The ink composition of claim 5 or 6, wherein the copolymer (B) further contains, in a molecule thereof, at least one recurring unit represented by formula (11):

$$\left[ \begin{array}{c} CR^{15}CH_2 \\ | \\ COOCH_2CR^{16} - CH_2 \\ \diagdown \; O \; \diagup \end{array} \right] \qquad (11)$$

wherein $R^{15}$ and $R^{16}$ are independently each a hydrogen atom or a methyl group.

* * * * *